(12) United States Patent
Tharp et al.

(10) Patent No.: US 11,346,474 B2
(45) Date of Patent: May 31, 2022

(54) CLAMP ASSEMBLY

(71) Applicant: ISCO Industries, Inc., Louisville, KY (US)

(72) Inventors: Lee David Tharp, Ozark, MO (US); Donald Allen McGriff, Huntsville, AL (US); Andrew Arod Rodgers, Louisville, KY (US)

(73) Assignee: ISCO Industries, Inc., Louisville, KY (US)

( * ) Notice: Subject to any disclaimer, the term of this patent is extended or adjusted under 35 U.S.C. 154(b) by 230 days.

(21) Appl. No.: 16/722,819

(22) Filed: Dec. 20, 2019

(65) Prior Publication Data

US 2020/0208764 A1 Jul. 2, 2020

Related U.S. Application Data

(60) Provisional application No. 62/785,340, filed on Dec. 27, 2018.

(51) Int. Cl.
*F16L 23/08* (2006.01)
*F16L 23/22* (2006.01)

(52) U.S. Cl.
CPC ............ *F16L 23/08* (2013.01); *F16L 23/22* (2013.01)

(58) Field of Classification Search
CPC ....... F16L 23/00; F16L 23/003; F16L 23/006; F16L 23/04; F16L 23/08; F16L 23/12; F16L 23/16; F16L 55/11; F16L 55/1141; F16L 55/1115; F16L 55/178; F16L 2201/80

USPC .................. 285/367, 414, 415, 337, 901
See application file for complete search history.

(56) References Cited

U.S. PATENT DOCUMENTS

| | | | |
|---|---|---|---|
| 3,639,718 A * | 2/1972 | Castonguay | ............ C30B 15/26 219/651 |
| 9,415,542 B2 | 8/2016 | Montgomery | |
| 10,780,649 B2 | 9/2020 | Montgomery | |

FOREIGN PATENT DOCUMENTS

| | | |
|---|---|---|
| CA | 2934317 | 10/2018 |
| CA | 3007568 C | 10/2020 |
| WO | 2015095374 | 6/2015 |

OTHER PUBLICATIONS

U.S. Appl. No. 17/021,424, filed Sep. 15, 2020 titled Assembly and Method of Coupling Pipes.
U.S. Appl. No. 16/951,803, filed Nov. 18, 2020 titled Assembly and Method of Coupling Pipes.
Canadian Patent Application 3,065,849 filed Dec. 20, 2019 titled Clamp Assembly.

* cited by examiner

*Primary Examiner* — Aaron M Dunwoody
(74) *Attorney, Agent, or Firm* — Middleton Reutlinger

(57) ABSTRACT

The present embodiments relate to a novel clamping assembly. More specifically, present embodiments relate to a clamping assembly for blind flange installation which provides an air tight seal for piping applications including, but not limited to, low pressure high-density polyethylene (HDPE) piping applications.

12 Claims, 4 Drawing Sheets

CLAMP ASSEMBLY

CLAIM TO PRIORITY

This non-provisional patent application claims priority to and benefit of, under 35 U.S.C. § 119(e), U.S. Provisional Patent Application Ser. No. 62/785,340, filed Dec. 27, 2018 and titled "Clamp Assembly", all of which is incorporated by reference herein.

BACKGROUND

1. Field of the Invention

The present embodiments relate to a novel clamping assembly. More specifically, but without limitation, present embodiments relate to a clamping assembly for blind flange installation which provides an air tight seal for low pressure high-density polyethylene (HDPE) piping applications.

2. Description of the Related Art

For decades the standard means of securing a blind flange to a flanged end of piping consisted of securing the blind with numerous circumferentially spaced bolts passing through the blind flange and the flanged end of pipe with a gasket in between the blind flange and the flanged pipe end. Under current practice, the flanged end of pipe will have an HDPE flange adapter and metal backing ring or a full HDPE flange with no backing ring. The piping systems related to this application can range from 8" nominal diameter pipe to as large as 72" nominal diameter pipe.

When maintenance or operations requires removal of the blind to access the adjoining pipe, significant time is required to remove the numerous bolts securing the blind flange and reinstalling the blind when work is complete.

In addition, expansion and contraction of an HDPE blind flange due to ambient temperature variations can allow the air tight seal to be compromised between the bolts and thereby not meeting the operational requirements of the piping system.

The information included in this Background section of the specification, including any references cited herein and any description or discussion thereof, is included for technical reference purposes only and is not to be regarded subject matter by which the scope of the invention is to be bound.

SUMMARY

The present embodiments provide a clamp assembly with continuous restraint about the circumference of a blind flange and the flanged end of pipe for non-limiting example, an HDPE pipe, and sealing pressures on the gasket between the blind flange and the flanged end of pipe. The present embodiments are used with a full flanged pipe end or flange adapter without the use of a metal backing ring.

The present embodiments comprise only 2 bolts regardless of the pipe diameter and the bolts only need loosening rather than complete removal when installing or removing the blind flange. Further, the risk of the air tight seal being compromised is eliminated because the assembly provides constant pressure around the circumference of the blind flange and full flanged pipe end, whereas, the traditional method only provide constant pressure at each bolt and not between the bolts.

According to some embodiments, a flange clamp assembly comprises a first substantially semi-circular clamp portion and a second substantially semi-circular clamp portion opposite the first substantially semi-circular clamp portion, a first fastener at one end of the first substantially semi-circular clamp portion and the second substantially semi-circular clamp portion and a receiving bushing at second opposed end of the first substantially semi-circular clamp portion and the second substantially semi-circular clamp portion, a connector fastener disposed on the first pair of fasteners and configured to be tightened relative to the receiving bushing. A first lip and a second lip may extend from both the first edge and a second edge of each of the first and second substantially semi-circular clamp portions. A blind flange may be capable of positioning on a pipe flange extending about a pipe opening, the blind flange and pipe flange may be sized to fit within the first and second substantially semi-circular portions and between said first and second lips and be locked in position by tightening of the connector fasteners.

Some optional embodiments may be utilized with the previous embodiment, either alone or in combination with other optional embodiments. The first lip and the second lip may each extend from a central segment. The first and second substantially semi-circular clamp portions together may provide a substantially continuous circumferential force. The flange clamp may further comprise a gasket disposed beneath the blind flange. The blind flange may be high density polyethylene, pvc, aluminum, steel or other metallic material. The first lip and the second lip may be of differing lengths and/or may be of differing angles relative to the first and second substantially semi-circular clamp portions.

According to some embodiments, a flange clamp assembly may comprise a first clamp portion and a second clamp portion, a first mechanical fastener assembly extending from the first clamp portion and engaging the second clamp portion, a second mechanical fastener assembly extending from the second clamp portion and engaging the first clamp portion, a gasket disposed between a blind flange and a pipe flange, the first and second clamp portions retaining the blind flange on the pipe flange being tightened at the first mechanical fastener assembly and the second mechanical fastener assembly.

Some optional embodiments may be utilized with the previous embodiment, either alone or in combination with other optional embodiments. The gasket may be formed of one of neoprene, EPDM, nitrile, and FKM. The first clamp portion and the second clamp portion each may further comprise first and second lips. The first and second lips may be either the same length or differing lengths. The first and second lips may be either perpendicular to a central segment or being angled greater than 90 degrees from the central segment.

According to some embodiments, a method of covering a pipe may comprise placing a blind flange at a pipe flange, placing a first spine and a second spine about the blind flange and the pipe flange circumferentially and engaging each of the blind flange and the pipe flange, tightening a fastener assembly at circumferential ends of each spine, and placing a substantially continuous force on the blind flange and pipe flange.

According to some optional embodiments, the method may further comprise applying in a tangential direction a force from the tightening. The method may further comprise tightening the first spine and the second spine at opposite semi-circular ends. The method may further comprise placing a gasket between the blind flange and pipe flange. The method may further comprise forming each spine of a first central segment and lip and a second central segment and lip. The method may further comprise engaging the blind flange with one of the first lip or the second lip and engaging the pipe flange with the other of the first lip or the second lip.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a clamping assembly will now be described by way of examples. These embodiments are not to limit the scope of the claims as other embodiments of a clamping assembly will become apparent to one having ordinary skill in the art upon reading the instant description. Non-limiting examples of the present embodiments are shown in figures wherein:

DETAILED DESCRIPTION

Figure 1:
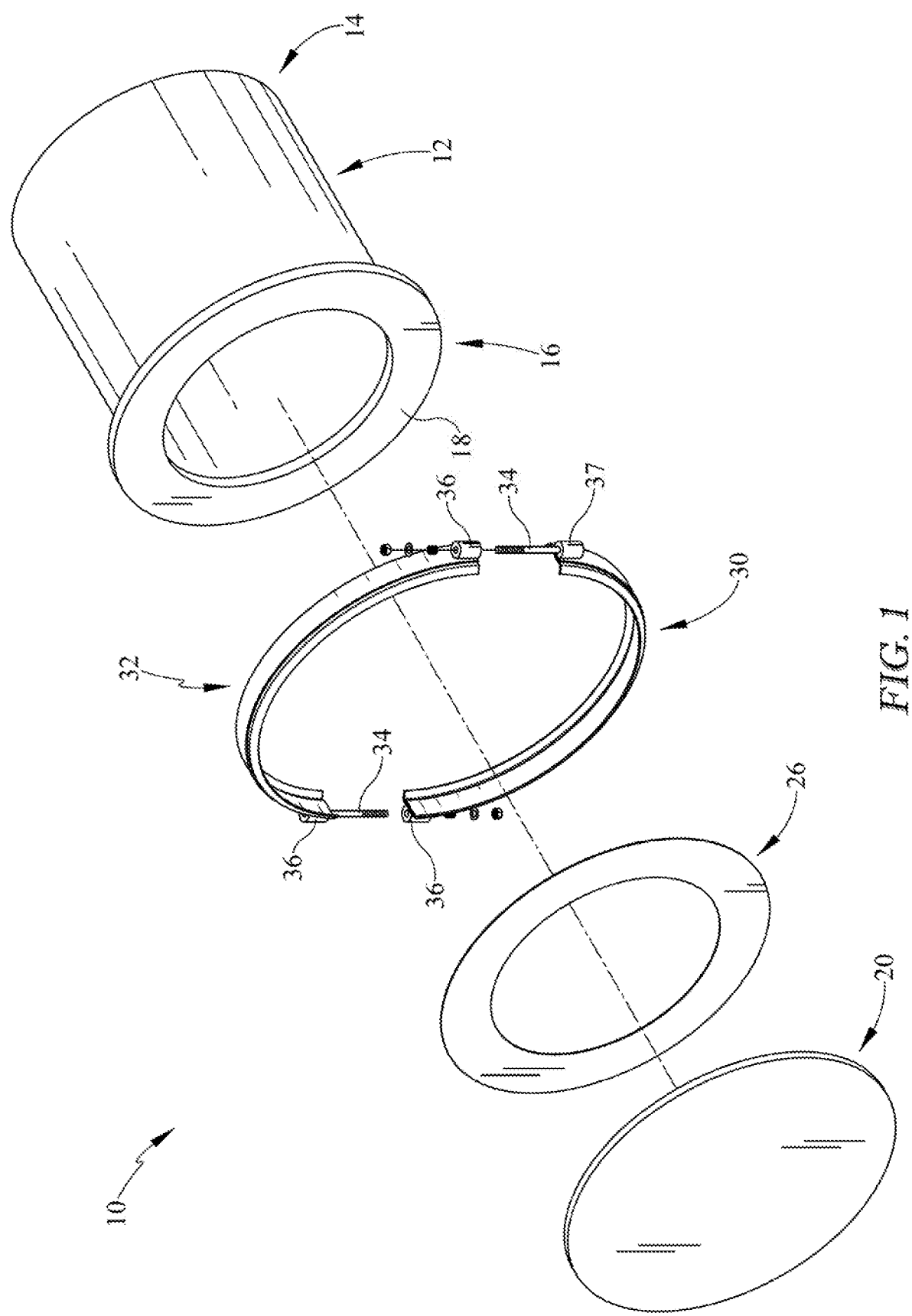
FIG. 1 depicts an exploded view of one example of a clamping assembly as installed with a blind flange, gasket, flanged end of pipe according to various embodiments of the present invention.

It is to be understood that a clamping assembly is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terminology used herein is for the purpose of describing particular embodiments only and is not intended to be limiting to the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and/or "comprising", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning this is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

With reference to FIGS. 1-4, embodiments of the instant flange clamp assembly provide a connection, in some instances air tight connection, between a blind flange and a pipe flange. The flange clamp assembly of the instant embodiments provide a connection which extends around the pipe flange without requiring tightening or loosening of a large number of bolts extending about the periphery of the blind and pipe flange. The instant flange clamp includes circumferentially extending spines or clamp portions which provide a more constant continuous force about the periphery of the blind flange and the pipe flange to maintain the sealed connection. Further, the removal of the blind flange merely requires loosening of two fasteners in order to loosen the blind flange from the pipe flange, but does not require complete removal of the bolts. New airtight blind flange clamping devices, apparatuses and methods for use on HDPE piping systems operating under low, or no, pressure conditions are discussed herein.

In the following description, for purposes of explanation, numerous specific details are set forth in order to provide a thorough understanding of the present embodiments. It will be evident, however, to one skilled in the art that the present embodiments may be utilized with these or other structural details. The present disclosure is to be considered as an exemplification, and is not intended to be limited to the specific embodiments illustrated by the figures or description below.

Referring now to FIG. 1, an exploded perspective view of a flange clamp assembly 10 is provided for purpose of explanation of the parts. Starting at the right hand side of the Figure, a pipe 12 is provided and may have a large range of sizes. The pipe 12 includes a first end 14, a second end 16, and a flange 18 at an end. The flange 18 provides a location for a blind (or blind flange) 20 and gasket 26 to be mounted in a sealing arrangement with the pipe 12. The pipe 12 may be formed of various materials including but not limited to iron based materials, steel, steel alloys, high density polyethylene (HDPE), low density polyethylene (LDPE), PVC, CPVC, and other materials. The pipe 12 may range in size from as small as six (6) inches diameter up to seventy-two (72) inches or more.

Moving to the left of pipe 12, a first clamp portion (or first spine) 30 is shown opposite a second clamp portion (or second spine) 32. The two spines 30, 32 are shown spaced from the flange 18 but when fully assembled engaged the pipe flange 18 and retain the blind flange 20 and gasket 26 in position against the pipe flange 18. The spines 30, 32 are shown having a substantially semi-circular shape, so that when assembled together, they extend about the circular shape of the pipe flange 18. The spines 30, 32 may extend to touch one another or may be spaced from one another at ends and still provide the substantially semi-circular shape.

The spines or clamp portions 30, 32 each have a fastener 34 disposed at one end and a female receiver 36 at an opposite end. The male fastener 34, for example, may be threaded rod and may be fixed to one of the spines 30. The receiver 36 may be threaded or may be a bushing free of threads, having a hollow body with open ends. The male fastener 34 of one spine 30 passes through the female receiver 36 of opposite spine 32, and vice versa. In some embodiments, the fastener 34 may be fixed relative to one spine and passing through the female receiver 36 of the second spine. In other embodiments, the male fastener 34 may be threadably connected. In still other embodiments, the threaded fastener 34 may extend through bushings on each spine 30, 32 to be engaged by nuts. On the opposite side of the female receiver 36, a nut 38 may threaded on to the male fastener 34 to connect the spines 30, 32.

The male fasteners 34 may extend in a direction which is generally tangential to the clamp portions 30, 32. In this way, the fasteners 34 do not interfere with the clamping function by crossing the spines. Further, the tightening of the nut 38 on the fastener 34 causes a substantially continuous force about the spines 30, 32. Thus, the force is not concentrated at specific bolts, as with prior art connections. Even if the spines 30, 32 do not extend to touch one another, it should still be understood that the spines provide a substantially continuous force extending about the spine structures, rather than point specific loadings.

The same assembly of fasteners may be utilized 180 degrees apart at the other ends of the spines 30, 32. When nuts 38 are applied to male fasteners 34, the ends of the clamp portions 30, 32 are pulled together.

Some or all components of the clamp assembly 10 may be formed of steel, or alloys thereof, and can be coated or uncoated. The spines 30, 32 and clamp assembly 10 may alternatively be formed of injection molded polymers. Coatings can include galvanization, epoxy or paint for corrosion prevention. Dimensions and angles may vary based on the nominal pipe size of the blind flange 20, gasket 26, and pipe flange 18 and the operating conditions the device is to be used. While this device has been depicted for use with HDPE blind flange 20 and pipe flange 18, the device is not limited by these materials. The material to be clamped can be PVC, CPVC, metal alloys, aluminum and other materials in various embodiments of the present invention.

Figure 3:
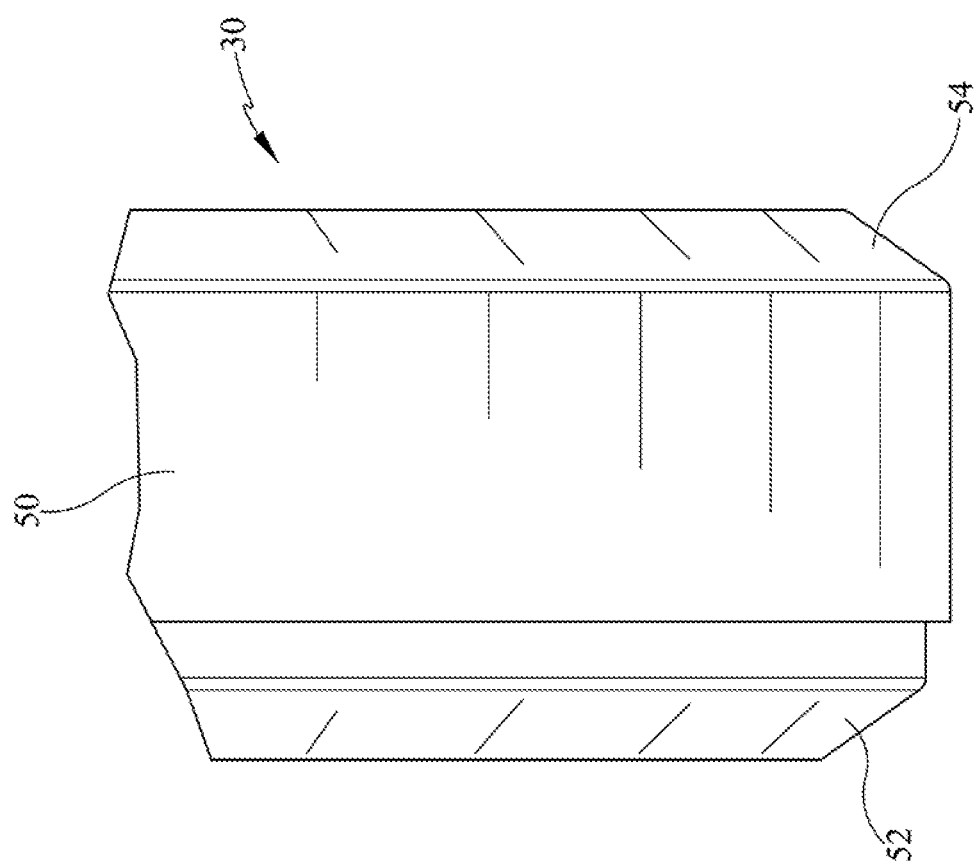
FIG. 3. depicts an end view of a spine exploded view of a clamping assembly according to various embodiments; and, FIGS. 4a-4c are various views of the spines.
Figure 4C:
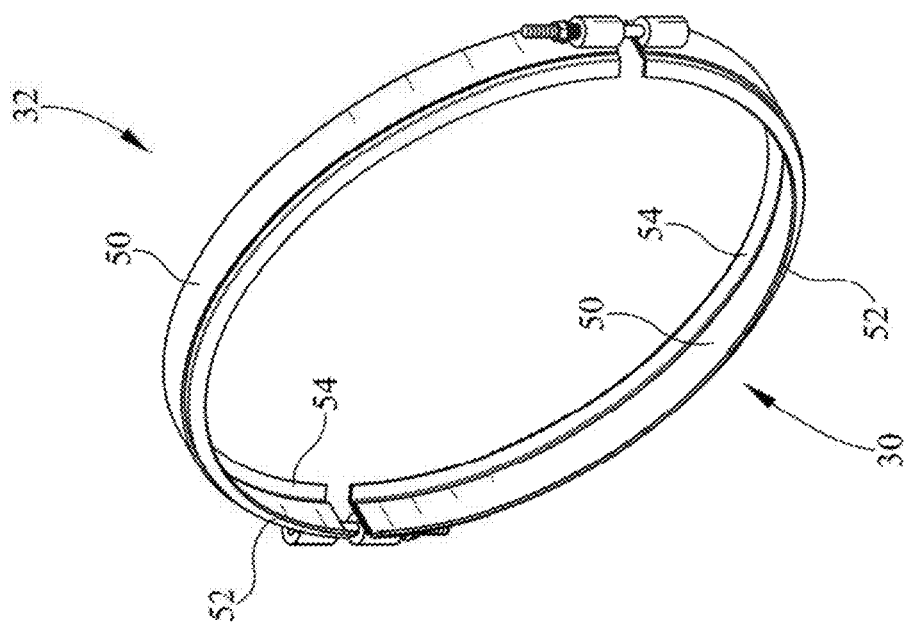
Figure 4B:
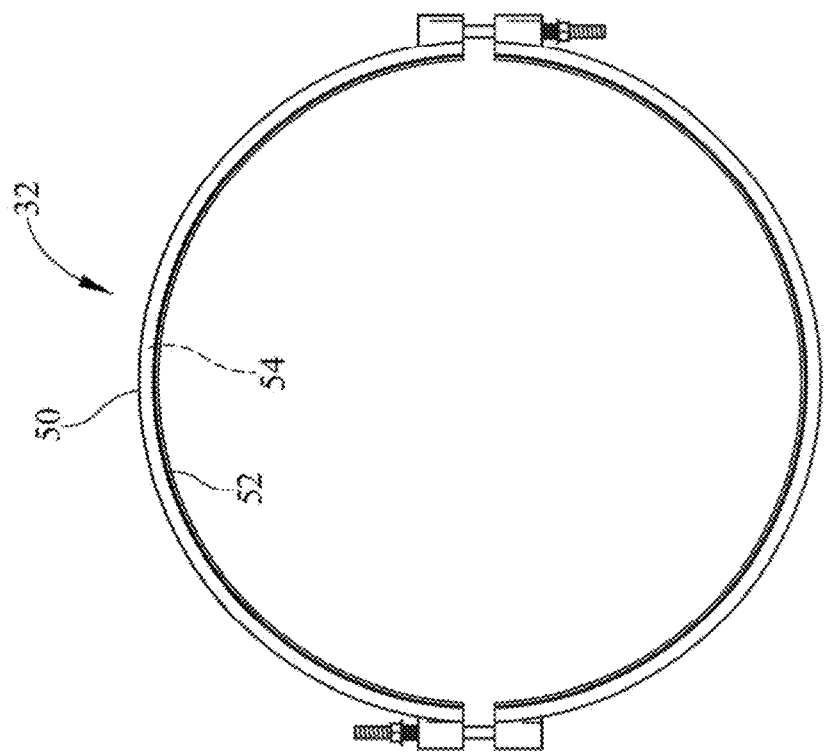
Figure 4A:

As shown in the detail view of FIG. 3, and in addition to FIG. 1, each of the spines 30, 32 has a U-shaped cross-section. The cross-section is formed of a central segment 50 and lips 52, 54 extending from the central segment. The segment 50 and lips 52, 54 extend circumferentially for some arcuate distance, and in the instant embodiment extend about 180 degrees depending on the length of the segment 50. The lips 52, 54 each engage one of the blind flange 20 and the pipe flange 18.

When the spines 30, 32 are disposed about the pipe flange 18, the spines 30, 32 capture the pipe flange 18 and the blind flange 20 generally between the lips 52, 54. As the blind flange 20, the gasket 26, and the pipe flange 18 are captured, the nuts 38 may be tightened to pull the spines or clamp portions 30, 32 together. In this way, the blind flange 20 is pulled against the pipe flange 18 in sealing engagement continuously about the arcuate length of the spines 30, 32.

Figure 2:
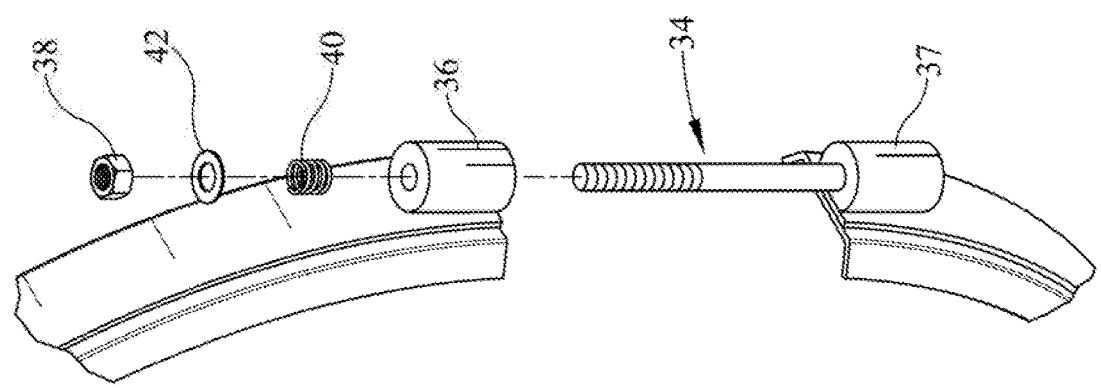
FIG. 2 is an exploded detail view of a portion of the clamp assembly.

Referring now to FIG. 2, a perspective detail view of the fasteners are shown to describe the connection of spines 30, 32. According to some embodiments, the threaded fasteners 34 may be fixed relative to a mount 37 at one end of each spine 30, 32. In some embodiments, the fixed threaded fastener 34 and mount 37 are not separable and act as one component, or in other embodiments, may be separable. The clamp portions 30, 32 are secured around the circumference of the blind flange 20, the gasket 26, and the pipe flange 18 by inserting the threaded fastener 34 into the receiver or unthreaded bushing 36 on the opposing spine. Alternatively, each of the mounts 37 may be threaded so that the threaded fastener 34 rotates through to engage an opposite threaded mount, or an unthreaded bushing mount 37 and nut 38, as shown. In still further embodiments, the mounts 36, 37 may both be unthreaded and the fastener 34 may extend through both with nuts used at both ends of the threaded fastener to pull the spines 30, 32 together. The arrangement for tightening may be constructed in various forms. The bushings or threaded mounts may be integrally formed with the spines 30, 32, but in some embodiments, the bushings or mounts may be welded, or otherwise joined.

In the instant embodiment, the assembly of fastener 34 and nut 38 may also comprise a compression spring 40 and a flat washer 42, both of which are slidably positioned on to the fixed threaded fastener 34. The retaining nut 38 is then threaded onto fixed threaded fastener 34 on each end of the clamping spines 30, 32 and tightened to an appropriate torque. The compression spring 40 is optional and may be typically used when ambient temperatures at the project site is highly variable. The compression spring 40 ensures constant pressure on the blind flange 20, the gasket 26, and the pipe flange 18. As mentioned, where the threaded fastener 34 extend through both mounts 36, 37, the nuts 38, springs 40, and/or flat washers 42 may be used at both ends of the fastener 34 rather than the single end depicted.

With reference to FIGS. 3 and 4a-4c, an end view of the spine 30 and other views are shown. The spine 30 is shown formed of the central segment 50 and first and second lips 52, 54. Spine 32 may be formed in a similar manner and therefore is not shown. The central segment 50 may be formed of one or more pieces of materials, for example flat stock. The lips 52, 54 extend from the central segment 50 to define the general U-shaped cross-section. Further, the lips 52, 54 may be bent from the flat stock defining the central segment 50 or may be welded to the flat stock defining the central portion 50. In still further embodiments, the central segments and lips may be formed by injection molding in the desired shape. The lips 52, 54 may be of the same length from the central segment or may be of varying length. Further, the lips 52, 54 may be formed perpendicular to the central segment or at an angle greater than 90 degrees, but less than 180 degrees. Subsequently, each pair of central segments 50 and lips 52, 54 are formed to define a C or U shaped cross-section. This may be dependent on the thickness and size of the blind flange and pipe flange.

In operation, the clamp assembly 10 may be performed in a various manners. According to some embodiments, the first spine 30 and the second spine 32 may be loosely connected by fasteners 34 which may extend from one end of each spine or alternatively may be separate but extend through each bushing 36, 37. In any embodiment, the fastener 34 may be tightened by one nut or nuts at each end of the fastener 34.

Before tightening however, the blind flange 20 may be disposed against the pipe flange 18. The gasket 26 may optionally be utilized. The spines 30, 32 are placed over the blind flange 20 and the pipe flange 18. Once positioned over both structures, and so that the lips 52, 54 are each engaging one of the blind flange 20 and the pipe flange 18, the splines 30, 32 may be tightened together. Initially, the nuts 38 may be hand tightened. Then the nuts may be further tightened by hand-tool to a desired torque specification. Once tightened, the blind flange 20 covers the pipe 12 opening and the pipe flange so that the pipe 12 is sealed closed. The force about the blind flange 20 and pipe flange 18 is substantially continuous rather than a plurality of point forces.

Although the present invention has been illustrated and described herein with specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A method of covering a pipe, comprising:
   placing a blind flange at a pipe flange;
   placing a first spine and a second spine about said blind flange and said pipe flange circumferentially and engaging each of said blind flange and said pipe flange;
   tightening a fastener assembly at circumferential ends of each spine; and,
   placing a continuous force on the blind flange and said pipe flange.

2. The method of claim 1, further comprising applying in a tangential direction a force from said tightening.

3. The method of claim 1 further comprising tightening said first spine and said second spine at opposite semicircular ends.

4. The method of claim 1 further comprising placing a gasket between said blind flange and said pipe flange.

5. The method of claim 1 further comprising forming said first spine of a first central segment and a first lip and a second lip, and forming said second spine of a second central segment and a first lip and a second lip.

6. The method of claim 5 further comprising engaging the blind flange with one of said first lips or said second lips and engaging the pipe flange with the other of said first lips or said second lips.

7. The method of claim 5 further comprising forming said first and second lips either of same lengths or of differing lengths.

8. The method of claim 5 further comprising said first and said second lips being of disposed at differing angles relative to said first and second central segments.

9. The method of claim 1 further comprising said first and second lips being either perpendicular to a central segment or being angled greater than 90 degrees from said central segment.

10. The method of claim 1 further wherein a circumferential force is substantially continuous.

11. The method of claim 1 further comprising providing a gasket disposed beneath said blind flange.

12. The method of claim 11, further comprising forming said gasket of one of neoprene, ethylene propylene diene monomer (EPDM), nitrile, and fluorocarbon elastomers (FKM).

* * * * *